United States Patent
Takaguchi et al.

(10) Patent No.: US 12,220,976 B2
(45) Date of Patent: Feb. 11, 2025

(54) ELECTRIC WORK VEHICLE

(71) Applicant: Daimler Truck AG, Leinfelden-Echterdingen (DE)

(72) Inventors: Hidehiko Takaguchi, Kawasaki (JP); Katsuhiko Matsumoto, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 316 days.

(21) Appl. No.: 17/915,874

(22) PCT Filed: Mar. 29, 2021

(86) PCT No.: PCT/JP2021/013322
§ 371 (c)(1),
(2) Date: Sep. 29, 2022

(87) PCT Pub. No.: WO2021/200833
PCT Pub. Date: Oct. 7, 2021

(65) Prior Publication Data
US 2023/0126938 A1  Apr. 27, 2023

(30) Foreign Application Priority Data

Mar. 31, 2020  (JP) ................. 2020-062204

(51) Int. Cl.
*B60K 1/00* (2006.01)
*B60K 25/00* (2006.01)
*B60L 1/00* (2006.01)
*B60L 50/60* (2019.01)

(52) U.S. Cl.
CPC ............... *B60K 1/00* (2013.01); *B60K 25/00* (2013.01); *B60L 1/003* (2013.01); *B60L 50/60* (2019.02);
(Continued)

(58) Field of Classification Search
CPC .... B60K 1/00; B60K 25/00; B60K 2025/005; B60L 1/003; B60L 50/60; B60L 2200/36; B60L 2200/40
See application file for complete search history.

(56) References Cited

U.S. PATENT DOCUMENTS 11,345,331 B2  5/2022  McKibben et al.
2018/0319263 A1*  11/2018  Hegewald ............... B60L 53/80
(Continued)

FOREIGN PATENT DOCUMENTS

CN  106274425 A  1/2017
EP  2 319 721 A1  5/2011
(Continued)

OTHER PUBLICATIONS

English-language Extended European Search Report issued in European Application No. 21780362.6-1012 dated Oct. 27, 2023 (5 pages).
(Continued)

*Primary Examiner* — Erez Gurari
(74) *Attorney, Agent, or Firm* — Crowell & Moring LLP

(57) ABSTRACT

An electric work vehicle includes a mounted body enabling execution of a specific work. The electric work vehicle further includes a main frame, a cab in a front portion of the main frame, an electrical component unit on the main frame in a position lower than a lower surface of the cab, and a power take off (PTO) unit having a work machine drive unit for driving a work machine to execute the specific work by the mounted body, and a mounted motor for supplying rotational power, by electric power of the battery, to the work machine drive unit. In the PTO unit, the mounted motor is in a position lower than the lower surface of the cab and in a lowermost layer region of a space where the electrical component unit is disposed, and the work machine
(Continued)

drive unit is disposed in a position rearward from the mounted motor.

9 Claims, 7 Drawing Sheets

(52) U.S. Cl.
CPC ..... *B60K 2025/005* (2013.01); *B60L 2200/36* (2013.01); *B60L 2200/40* (2013.01)

(56) References Cited

U.S. PATENT DOCUMENTS

| | | | |
|---|---|---|---|
| 2023/0126938 A1* | 4/2023 | Takaguchi | B60K 1/04 180/53.5 |
| 2024/0149709 A1* | 5/2024 | Archer | B60R 16/0207 |

FOREIGN PATENT DOCUMENTS

| | | |
|---|---|---|
| EP | 4 041 589 A1 | 8/2022 |
| JP | 2016-113063 A | 6/2016 |
| JP | 2017-217944 A | 12/2017 |
| JP | 2018-133968 A | 8/2018 |
| JP | 2019-134603 A | 8/2019 |
| KR | 10-2020-0011712 A | 2/2020 |
| WO | WO 2019/230286 A1 | 12/2019 |
| WO | WO 2020/035990 A1 | 2/2020 |
| WO | WO 2020/090171 A1 | 5/2020 |

OTHER PUBLICATIONS

PCT/JP2021/013322, International Search Report dated Jun. 8, 2021 (Two (2) pages).

* cited by examiner

ELECTRIC WORK VEHICLE

TECHNICAL FIELD

The present invention relates to an electric work vehicle.

BACKGROUND ART

In recent years, in a view of a reduction in environmental load, even in a field of commercial vehicles, such as trucks, developed have been electric trucks that do not include an internal combustion engine, and are driven solely by an electric motor (see Patent Document 1).

As in the case with trucks using an internal combustion engine as a drive source, also in case of the electric trucks described above, there has been a demand to develop electric work vehicles having a mounted body, to be mounted on a vehicle body of a truck, enabling specific operations, such as a garbage vehicle, a freezing vehicle, a refrigeration vehicle, a dump truck vehicle, a mixer vehicle, a fire vehicle, and the like.

CITATION LIST

Patent Document

Patent Document 1: Japanese Unexamined Patent Publication No. 2016-113063

SUMMARY OF THE INVENTION

Technical Problem

Such an electric work vehicle has an electric power take off (PTO) unit, including a motor, for supplying power to a mounted body. However, the PTO unit is usually added to an existing electric truck restricting it in terms of layout.

For example, in an electric truck, a component for driving the vehicle etc. is mounted in an under-cab region corresponding to an engine room in a truck using an internal combustion engine as a drive source, and a space in which the PTO unit is to be mounted is limited. Further, in a view of manufacturing cost, there is a demand that an electric work vehicle requiring a PTO unit and a common electric truck requiring a PTO unit share an identical mounting layout of electrical components.

Considering the limitation of layout of an under-cab region, it may also be conceivable to mount the PTO unit in a cab back space, between the cab and a cargo bed. However, in this case, to secure enough space in a cab back space for a large PTO unit, a front face of the cargo bed must be laid backward, which may disadvantageously result in reducing a length of the cargo bed, i.e. reducing load capacity.

The present invention has been made in view of the above circumstances, and an object thereof is to provide an electric work vehicle capable of preventing reduction in the length of the cargo bed (load capacity) due to mounting the PTO unit while influence of change in layout of the under-cab region in case the PTO unit is mounted is reduced.

Solution to the Problem

The present invention has been made to overcome at least some of the problems described above, and can be implemented as the following embodiments or application examples.

(1) An electric work vehicle of the present application example includes a mounted body enabling execution of a specific work, and is capable of running by electric power supplied from a battery. The electric work vehicle includes: left and right main frames that are paired and extend in a vehicle front-rear direction; a cab provided in a front portion of the main frame in the vehicle front-rear direction; an electrical component unit disposed on the main frame in a position lower than a lower surface of the cab; and a PTO unit having a work machine drive unit for driving a work machine to execute the specific work by the mounted body, and a mounted motor for supplying rotational power, by electric power of the battery, to the work machine drive unit. In the PTO unit, the mounted motor is in a position lower than the lower surface of the cab and in a lowermost layer region of a space where the electrical component unit is disposed, and the work machine drive unit is disposed in a position rearward from the mounted motor.

The mounted motor may be mounted without influencing the layout of the electrical component unit by disposing the mounted motor in a space in the lowermost layer region where the electrical component unit is disposed. Further, disposing a work machine drive unit, for driving a work machine of a mounted body, behind the mounted motor enables decrease in the distance between the work machine drive unit and the work machine, and reducing an influence on the layout on the side of the mounted body.

Thus, in a case in which the PTO unit, for driving the work machine drive unit by the mounted motor, is mounted, decrease in the length of the cargo bed (load capacity) resulting from mounting of the PTO unit may be prevented while influence of change in layout of the under-cab region is reduced.

(2) The electric work vehicle of the aspect (1) stated above may have the mounted motor arranged such that an output shaft thereof is directed rearward. Thus, it is possible to easily dispose even a mounted motor, which is long in the axial direction, in the under-cab region regardless of the interval between the left and right main frames.

(3) The electric work vehicle of the aspect (1) or (2) stated above includes a space, where the electrical component unit is disposed. The space has a multilayered structure including a plurality of electrical component support members on which the electrical component unit is mounted and supported. The mounted motor may be disposed on one of the electrical component support members that constitutes a bottom surface of the multilayered structure. In this way, the mounted motor may be disposed without influencing the layout of the electrical component support members and the mounted body.

(4) The electric work vehicle of any one of the aspects (1) to (3) stated above has the work machine drive unit disposed in a position higher than a height at which the mounted motor is mounted and disposed.

The work machine drive unit may be modified into various work equipment in accordance with contents of a specific work of the mounted body. The mounted motor may be disposed in a space, which is a lowermost layer region and in which the electrical component unit is disposed, considering influence of change in layout of the under-cab region. However, if the water resistance of the devices is low, and the vehicle runs at a place where a water level is high, the devices may break. For this reason, the work machine drive unit requires higher water resistance. Accordingly, the devices cannot be freely selected.

However, according to the electric work vehicle of the present application example, the work machine drive unit is positioned behind the mounted motor and in a position higher than the height at which the mounted motor is mounted and disposed. Thus, the work machine drive unit requires lower water resistance. Hence, even devices having a relatively low water resistance may be selected.

(5) The electric work vehicle of any one of the aspects (1) to (4) stated above may have the work machine drive unit disposed between the cab and the mounted body on the main frame via a drive unit support member in the vehicle front-rear direction. In this way, the work machine drive unit may be disposed without influencing the layout of the electrical component unit and the mounted body. Further, disposing the work machine drive unit at a position higher than the main frame reduces influence of stones and water, which bounce from the ground, on the work machine drive unit.

(6) The electric work vehicle of any one the aspects (1) to (5) stated above may have the work machine drive unit disposed at least partially between the sub-frames, the sub-frames supporting the mounted body, the sub-frames being provided on and/or between the left and right main frames that are paired.

In view of layout of the equipment, space between main frames, space between sub-frames and the like in the vicinity of a cab back space between the cab and the cargo bed are usually hardly to be utilized and are likely to become dead space. However, the electric work vehicle of the aspects stated above, has the work machine drive unit arranged in such the spaces. Thus, mounting the PTO unit does not make influence of change in layout of the under-cab region. Further, it is possible to mount the PTO unit without increase of the cab back space between the cab and the cargo bed, in contrast with a case when the whole PTO unit is to be mounted in the cab back space.

(7) In the electric work vehicle of any one the aspects (1) to (6) stated above, the mounted motor may be supported by a motor support member coupled to the main frame, and the work machine drive unit may be supported by the drive unit support member coupled to the motor support member. In this way, the mounted motor and the work machine drive unit are supported on the support members coupled, which enables alleviating the deviation due to vibration, between the mounted motor and the work machine drive unit, and more reliably transmitting the rotational power of the mounted motor to the work machine drive unit.

(8) In the electric work vehicle of any one of the aspects (1) to (7) stated above, the work machine drive unit may be compressor. Thus, in a case of mounting the PTO unit for driving the compressor, decrease in the length of the cargo bed (load capacity) resulting from mounting of the PTO unit may be prevented while influence of change in layout of the under-cab region is reduced.

(9) In the electric work vehicle of any one the aspects (1) to (8) stated above, the work machine drive unit may be a hydraulic pump. Thus, in a case of mounting the PTO unit for driving the hydraulic pump, decrease in the length of the cargo bed (load capacity) resulting from mounting of the PTO unit may be prevented while influence of change in layout of the under-cab region is reduced.

DESCRIPTION OF EMBODIMENT

Embodiments of the present invention will be now described in detail with reference to the accompanying drawings. It should be noted that the present invention is not limited to the following description and can be implemented by arbitrarily changing the scope of the present invention without departing from the spirit and scope of the present invention. Further, all the drawings used in the description of the embodiments schematically illustrate components. For ease of understanding, the drawings may be partially emphasized, enlarged, constricted, or omitted and they may not precisely illustrate the scale or the state or the components.

First Embodiment

Figure 1:
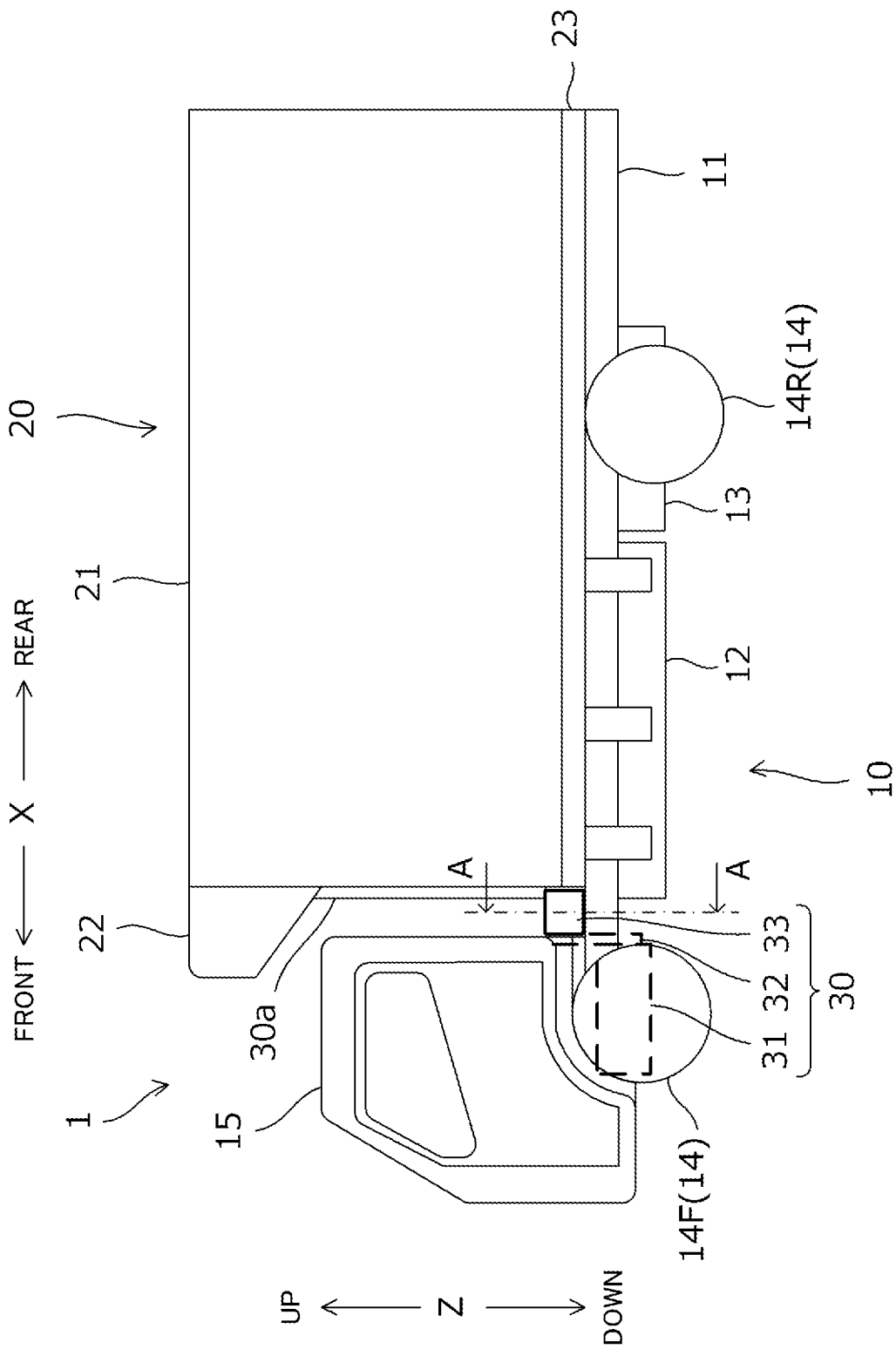
FIG. 1 is a side view of an electric work vehicle of a first embodiment of the present invention.

FIG. 1 is a side view of an electric work vehicle 1 according to a first embodiment of the present invention. The electric work vehicle 1 is an electric work vehicle for performing a specific operation, and the vehicle includes a vehicle body 10 as a driving component, a mounted body 20 mounted on the vehicle body 10, and a PTO unit 30 driving the mounted body 20. In the present embodiment, the electric work vehicle 1 will be described as a freezing vehicle, but the vehicle may be any other work vehicle such as a garbage vehicle, a dump truck vehicle, a mixer vehicle, a fire vehicle, a crane vehicle, or the like.

The vehicle body 10 includes a main frame 11, a battery 12, a running driving unit 13, wheels 14, and a cab 15.

The main frame 11 is a frame that support, in addition to the cab 15 and the mounted body 20, further heavy load to be mounted on the vehicle body 10. The battery 12 is a power supply source that supplies electric power necessary for running and driving the vehicle body 10 and driving electric equipment mounted on the electric work vehicle 1. As will be described later in detail, the running driving unit 13 converts the electric power supplied from the battery 12 into running power of the vehicle body 10 and transmits the electric power thus converted to the wheels 14. The wheels 14 are suspended on the main frame 11 and include a front wheel 14F provided below the cab 15 in the vehicle height direction (Z direction in the figure) and a rear wheel 14R driven by the running driving unit 13. The cab 15 is a structure including a driver seat and the like, and is provided in a front portion of the main frame 11 in the vehicle longitudinal direction (X direction in the figures).

In the present embodiment, the mounted body 20 is a mounted system for a freezing vehicle, and includes a freezing loading unit 21, a freezer 22, and sub-frames 23.

The freezing loading unit 21 is a structure onto which cargo or the like transported by the electric work vehicle 1 is loaded and in which the cargo or the like is frozen by keeping the inside of the unit at a low temperature. The freezer 22 is a work machine for freezing, and includes a freezing capacitor, and cools the inside of the freezing loading unit 21 by supplying refrigerant. The sub-frames 23 are disposed behind the cab 15 and interposed between the upper side of the main frame 11 and the freezing loading unit 21. Each of the sub-frames 23 is a support member supporting and fixing the freezing loading unit 21 indirectly to the main frame 11.

The PTO unit 30 converts the electric power supplied from the battery 12 into rotational power and drives the freezer 22 of the mounted body 20. In the present embodiment, the PTO unit 30 has a mounted motor 31 that is rotatably driven by the electric power of the battery 12, and a compressor 33 (work machine drive unit) that is driven by transmitting the rotational power of the mounted motor 31 via a belt 32, as will be described in detail later. As the compressor 33 is rotatably driven, the refrigerant is supplied to the freezer 22. More specifically, the PTO unit 30 circulates refrigerant to the freezer 22 through a refrigerant circuit 30a arranged along a surface of the freezing loading unit 21 that faces the cab 15.

Figure 2:
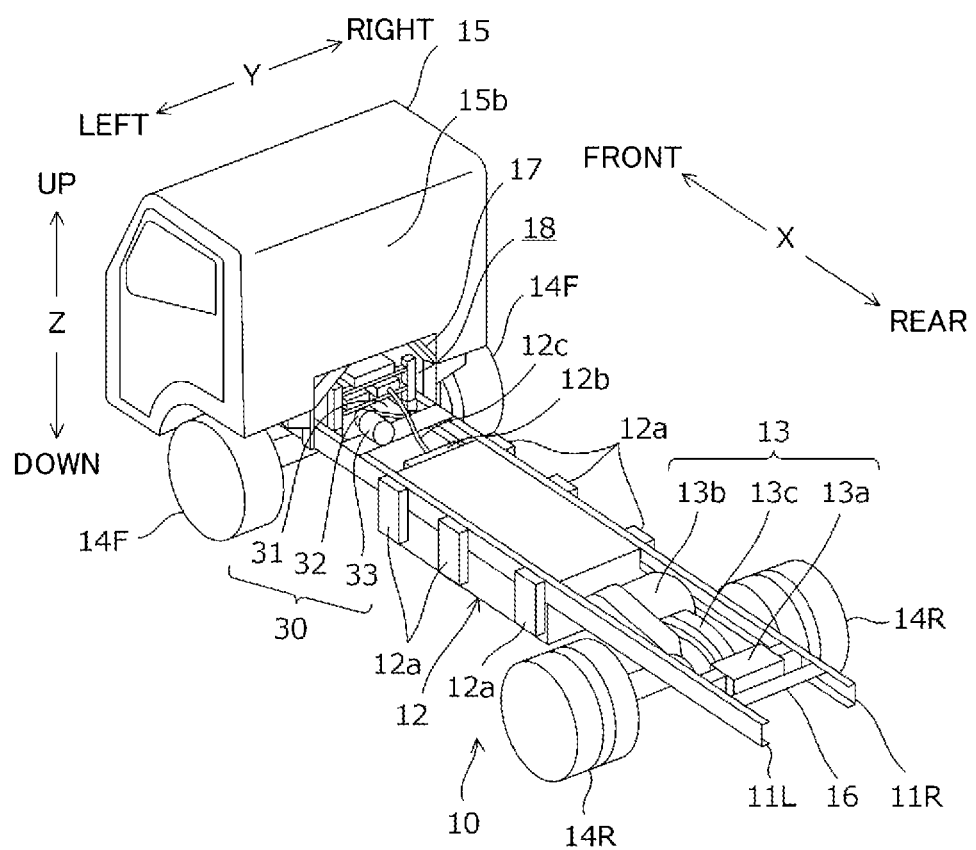
FIG. 2 is a perspective view illustrating a configuration of a vehicle body and a PTO unit.

Next, the configuration of the vehicle body 10 will be described in more detail. FIG. 2 is a perspective view illustrating the configuration of the vehicle body 10 and the PTO unit 30. More specifically, FIG. 2 is a perspective view of the electric work vehicle 1 viewed obliquely from a left rear side with the mounted body 20 removed.

The main frame 11 includes a left main frame 11L and a right main frame 11R that are paired. The left main frame 11L and the right main frame 11R extend in the vehicle longitudinal direction X of the electric work vehicle 1 and are disposed in parallel to each other in the vehicle width direction Y. The left main frame 11L and the right main frame 11R are connected by a plurality of cross members 16 (only one shown in FIG. 2) which extend in the vehicle width direction Y and constitute a so-called ladder frame. Although not illustrated in FIG. 2, the sub-frames 23 also extend in the vehicle longitudinal direction X, and includes a left sub-frame 23L disposed on the left main frame 11L, and a right sub-frame 23R disposed on the right main frame 11R.

As described above, the battery 12 is a secondary battery that supplies electric power necessary for running and driving the vehicle body 10 and driving the electric equipment. The battery 12 includes a plurality of battery modules (not shown) relatively large in size and having relatively large capacity in order to store the electric power required for both the vehicle body 10 and the electric equipment. Further, the battery 12 is configured to be capable of supplying electric power independently to the front and to the rear in the vehicle longitudinal direction X.

The battery 12 of the present embodiment has two integral portions: a portion formed into a roughly cuboid shape and disposed between the left main frame 11L and the right main frame 11R in the vehicle width direction Y; and a portion formed into a roughly cuboid shape and disposed below the main frame 11 in the vehicle height direction Z. The battery 12 has a cross-sectional shape of an inverted T taken along a plane perpendicular to the vehicle longitudinal direction X. The battery 12 is arranged such that the left main frame 11L and the right main frame 11R pass by a step portion formed due to a difference in a width of the two upper and lower portions. Accordingly, the battery 12 effectively utilizes the space below the mounted body 20, thereby increasing the battery capacity. Note that the shape of the battery 12 is not limited to the example stated above and may be changed depending on the required battery capacity and layout of the vehicle body 10 as appropriate.

The battery 12 is elastically suspended on the main frame 11 by a plurality of battery support members 12a from outside in the vehicle width direction Y. Further, the battery 12 is provided with a power distribution unit 12b serving as an "output terminal" in a front region in the vehicle longitudinal direction X. The power distribution unit 12b supplies electric power to the PTO unit 30 and an electrical component unit 40, which will be described later, via a high-voltage cable 12c.

More specifically, the power distribution unit (PDU) 12b distributes electric power from the battery 12 to each element of the electric equipment including the PTO unit 30 and the electrical component unit 40. In the present embodiment, the power distribution unit 12b is provided between the left main frame 11L and the right main frame 11R, in the vehicle width direction Y, and on a front outer surface of the battery 12 in the vehicle longitudinal direction X. Note that the position of the power distribution unit 12b is not limited to the example stated above. For instance, the power distribution unit 12b may be installed in the center portion of the upper surface of the battery 12, or independently, in a position spaced away from the front outer surface of the battery 12, to the front in the vehicle longitudinal direction X. In this case, the power distribution unit 12b is connected to the main body of the battery 12 through wiring. In addition, the power distribution unit 12b may be provided on a front interior surface inside a housing of the battery 12 in the vehicle longitudinal direction X. The high-voltage cable 12c may be extended from a front outer surface of the housing of the battery 12 in the vehicle longitudinal direction X.

The running driving unit 13 includes a running inverter 13a, a running motor 13b, and a speed reducer 13c, and converts electric power supplied from the battery 12 into running power for the vehicle body 10, as described above. More specifically, the running driving unit 13 converts DC power supplied from the battery 12 into AC power suitable for a proper running as appropriate, and supplies the AC power to the running motor 13b. Then, the speed reducer 13c decelerates the rotational power generated in the running motor 13b. Then, the vehicle body 10 is run by driving the rear wheel 14R via a differential and a rear axle.

Here, although not illustrated, the cab 15 has its front end lower portion vertically rotatably supported on the main frame 11, and forms a tiltable cab mount structure. A rear end lower portion of the cab 15 is supported by an elastic support member (not shown) in an inverted U-shaped cab bridge 17 that is provided to bridge the left main frame 11L and the right main frame 11R.

Figure 3:
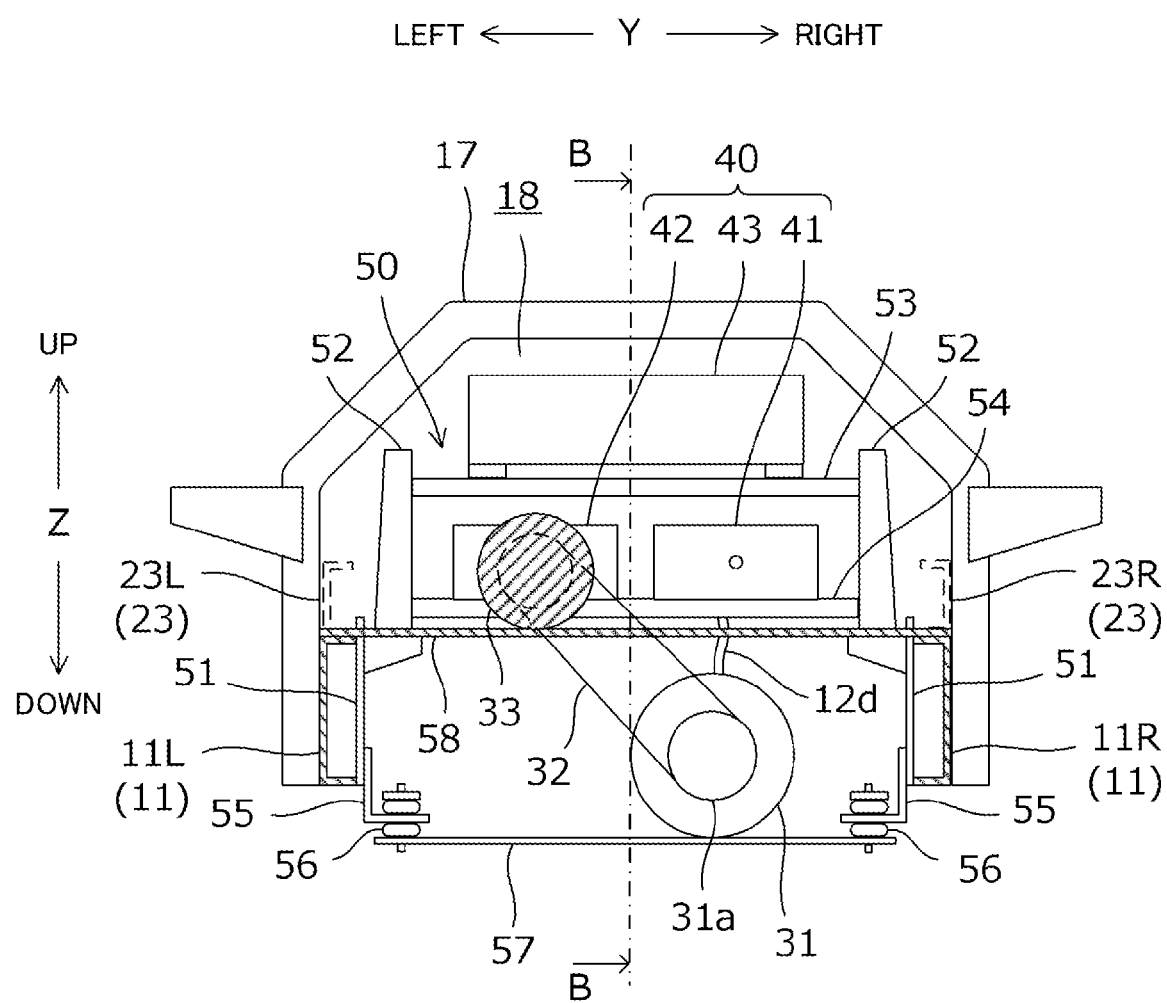
FIG. 3 is a cross-sectional view taken along the line A-A of FIG. 1.
Figure 4:
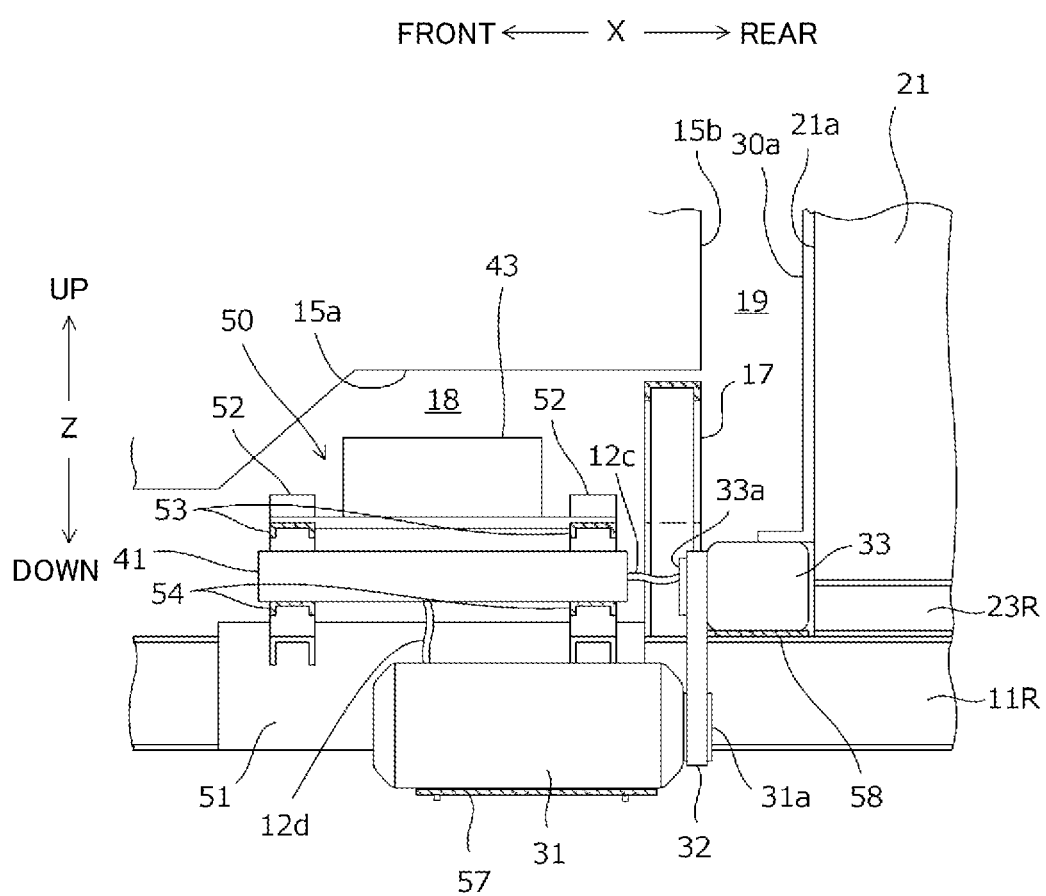
FIG. 4 is a cross-sectional view taken along the line B-B of FIG. 3.

Referring to FIGS. 3 and 4, FIG. 3 is a cross-sectional view taken along the line A-A of FIG. 1, and FIG. 4 is a cross-sectional view taken along the line B-B of FIG. 3.

As shown in FIGS. 3 and 4, an under-cab region 18 corresponding to an engine room in a conventional cab-over engine truck is formed below a lower surface 15a of the cab 15. Further, as shown in FIG. 4, a cab back space 19 is formed between a back surface 15b of the cab 15 and the front surface of the mounted body 20, i.e., the front surface 21a of the freezing loading unit 21. In the present embodiment, the PTO unit 30 and the electrical component unit 40 are accommodated in a space reaching from an under-cab region 18 to the cab back space 19.

Specifically, in the under-cab region 18, an electrical component support member 50, having a multilayered structure, is provided on the main frames 11 that are paired. The electrical component support member 50 includes a plurality of support members. Each main frame 11 has a base plate 51 attached on the internal side in the vehicle width direction. The base plate 51 is provided with support props 52, each extending upward in the vehicle height direction Z. In the upper portion of the support props 52, an upper beam 53 extends in the vehicle width direction Y between the left support prop and the right support prop. Below the upper beam 53 in the vehicle height direction Z, a middle beam 54 extends in the vehicle width direction Y between the left support prop and the right support prop. Further, lower brackets 55 are provided at the front and the back in a lower portion of each base plate 51. A bottom plate 57 is supported by each lower bracket 55 via dampers 56. As described above, the electrical component support member 50 has a three-layer structure consisting of a top level, a middle level, and a bottom level.

The electrical component unit 40 is provided in the top level and the middle level of the electrical component support member 50. The electrical component unit 40 consists of one or more electrical components mainly for driving the vehicle. The electrical component unit 40 includes: for example, a high-voltage inverter 41 converting DC power, supplied via the high-voltage cable 12c from the power distribution unit 12b, into AC power; a DC-DC converter 42 converting DC power, from the battery 12 for driving, into low-voltage; and a control unit 43 that performs various controls of the vehicle. The high-voltage inverter 41 is connected to the mounted motor 31 via wiring 12d. Note that the type of electrical component is not limited to this example, and these electrical components may be not equipped, or another electrical component may be included.

Further, the bottom plate 57 (a motor support member) corresponding to the bottom level of the electrical component support member 50 is disposed at a position lower than the main frame 11. The mounted motor 31 of the PTO unit 30 is provided on the right side in the vehicle width direction Y from the center on the top of the bottom plate 57. That is, the mounted motor 31 is disposed at the lowest position of the electrical component support member 50. The mounted motor 31 is elongated in the vehicle longitudinal direction X, and has the output shaft extending rearward. A motor-side pulley 31a is attached to the output shaft.

The compressor 33 of the PTO unit 30 is disposed in the cab back space 19. Specifically, a support plate 58 (drive unit support member) extending in the vehicle width direction and is stretched between the left and right main frames 11 that are paired. The compressor 33 is provided on the left side viewed from the center in the vehicle width direction Y on the top of the support plate 58. The length of the compressor 33 in the vehicle longitudinal direction X fits in the cab back space 19 and is located in front of the freezing loading unit 21 and the sub-frames 23 of the mounted body 20.

A compressor-side pulley 33a is provided on an input shaft of the compressor 33. The belt 32 is wound around the compressor-side pulley 33a and the motor-side pulley 31a such that the rotational power of the mounted motor 31 can be transmitted to the compressor 33 via the belt 32.

In the electric work vehicle 1 configured as described above, electric power of the battery 12 is supplied to the mounted motor 31 through the high-voltage inverter 41 of the electrical component unit 40, and is converted into the rotational power by the mounted motor 31. The rotational power generated by the mounted motor 31 is transmitted to the compressor 33 via the belt 32. Thereafter, the refrigerant is supplied to the freezer 22 through the refrigerant circuit 30a by driving of the compressor 33. The operation is then executed by the freezer 22.

As described above, the mounted motor 31 may be mounted in the under-cab region 18 of the electric work vehicle 1 of the first embodiment of the present invention while influence the layout of the electrical component unit 40 is reduced, by disposing the mounted motor 31 of the PTO unit 30 in the lowermost layer region of the space where the electrical component unit 40 is disposed. Further, disposing the compressor 33 for driving the freezer 22 of the mounted body 20 behind the mounted motor 31 in the vehicle longitudinal direction X enables decrease in the distance between the compressor 33 and the freezer 22, as well as reduction in influence on the layout on the side of the mounted body 20.

Thus, in case of mounting the PTO unit 30 for driving the compressor 33 by the mounted motor 31, the risk of decrease in the length of the cargo bed (load capacity) resulting from mounting of the PTO unit 30 may be prevented while influence of change in layout of the under-cab region 18 is reduced.

Further, the mounted motor 31 is arranged such that its output shaft is directed rearward. Accordingly, even a mounted motor 31 that is long in the axial direction can be easily disposed in the under-cab region 18 regardless of the interval between the left and right main frames 11.

In addition, the space in which the electrical component unit 40 is disposed has a multilayered structure including the plurality of electrical component support members on which the electrical component unit 40 is mounted and supported. The mounted motor 31 is disposed on the bottom plate 57 which is an electrical component support member constituting the bottom surface of the multilayered structure. Thereby, the mounted motor 31 may be mounted without influencing the layout of the electrical component unit 40 and the mounted body 20.

Further, the compressor 33 is disposed higher than the mounted motor 31. Accordingly, the water resistance required for the compressor 33 becomes lower. Hence, even a device having a relatively low water resistance may be selected.

Furthermore, the compressor 33 is arranged on the main frame 11 via the support plate 58 between the cab 15 and the mounted body 20 in the cab back space 19 in the vehicle longitudinal direction X. Accordingly, the compressor 33 may be mounted while influence on the layout of the electrical component unit 40 and the mounted body 20 is reduced. Further, the compressor is arranged at a position higher than the main frame 11, which may reduce the influence of stones and water, bouncing from the ground, on the compressor 33. Therefore, the layout of the PTO unit 30 like that of the present embodiment is suitable particularly in a case in which a work machine drive unit has lower durability and waterproof properties than a mounted motor and the like.

Second Embodiment

A second embodiment of the present invention will be now described. A PTO unit 60 of an electric work vehicle 2 of the present invention is different from the PTO unit 30 of the electric work vehicle 1 of the foregoing first embodiment. Hereinafter, parts different from those of the first embodiment will be described. Components common to those of the first embodiment will be denoted by the same reference numerals, and detailed description thereof will be omitted.

Figure 5:
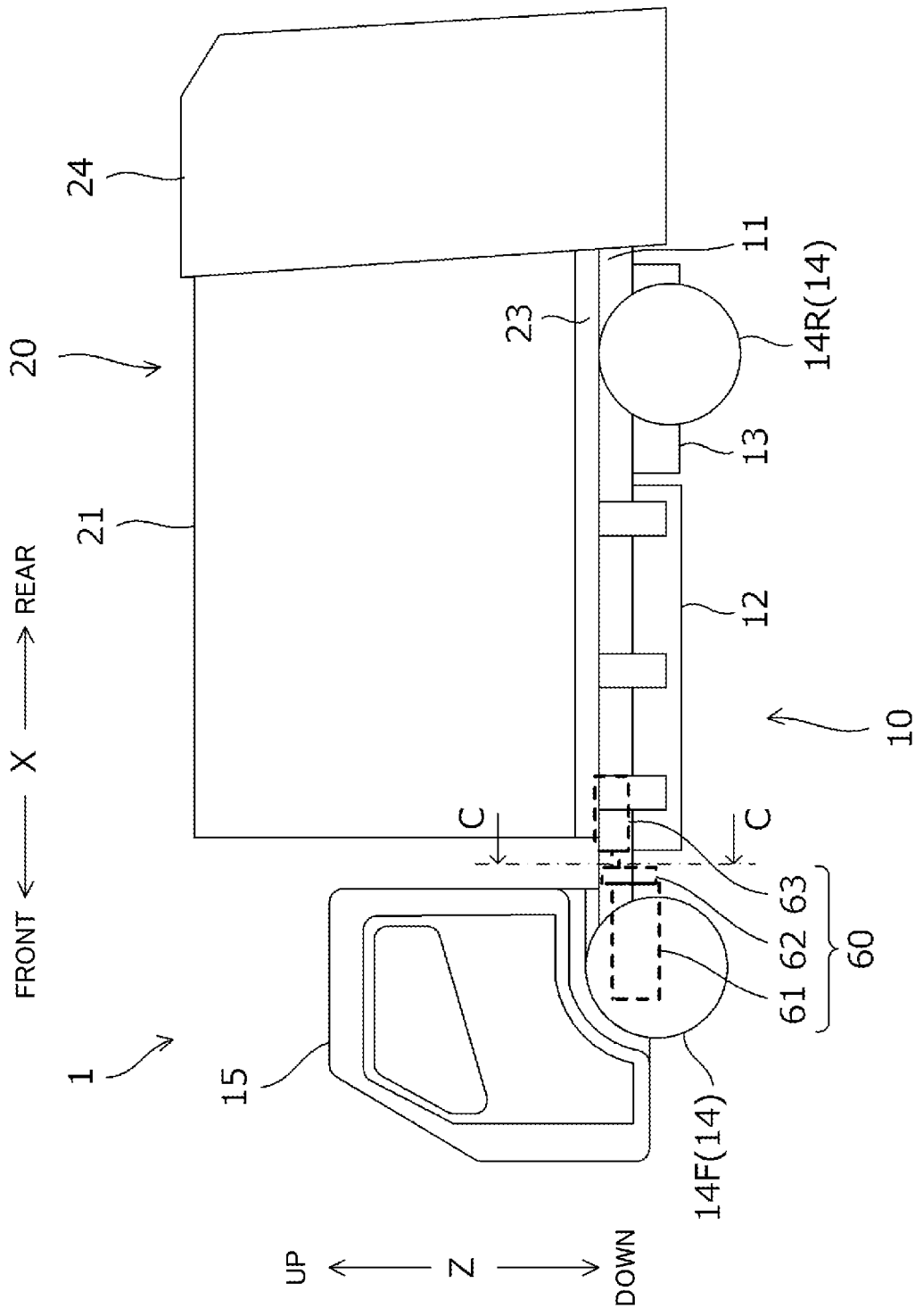
FIG. 5 is a side view of the electric work vehicle of a second embodiment of the present invention.
Figure 6:
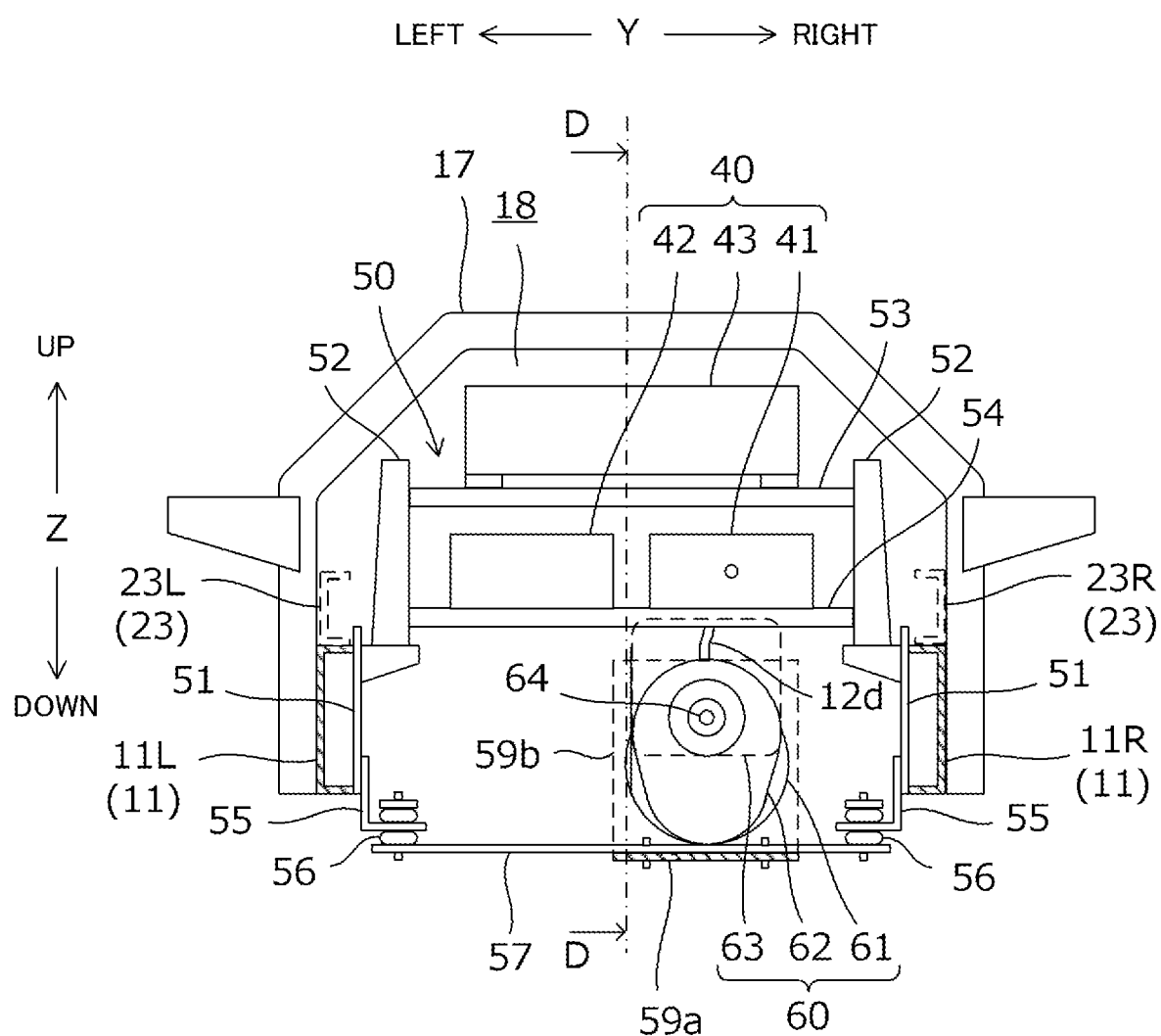
FIG. 6 is a cross-sectional view taken along the line C-C of FIG. 5.

FIG. 5 is a side view of the electric work vehicle 2 of the second embodiment of the present invention. FIG. 6 is a cross-sectional view taken along line C-C of FIG. 5, and FIG. 7 is a cross-sectional view taken along line D-D of FIG. 6.

The electric work vehicle 2 according to the second embodiment illustrated in FIG. is a garbage work vehicle including a mounted body 20 for driving a garbage work machine 24 with hydraulic pressure. The garbage work vehicle includes a PTO unit 60. The PTO unit 60 transmits the rotational power of a mounted motor 61 to a hydraulic pump 63 via a gearbox 62 and drives the garbage work machine 24 with the hydraulic pressure generated by the hydraulic pump 63.

Figure 7:
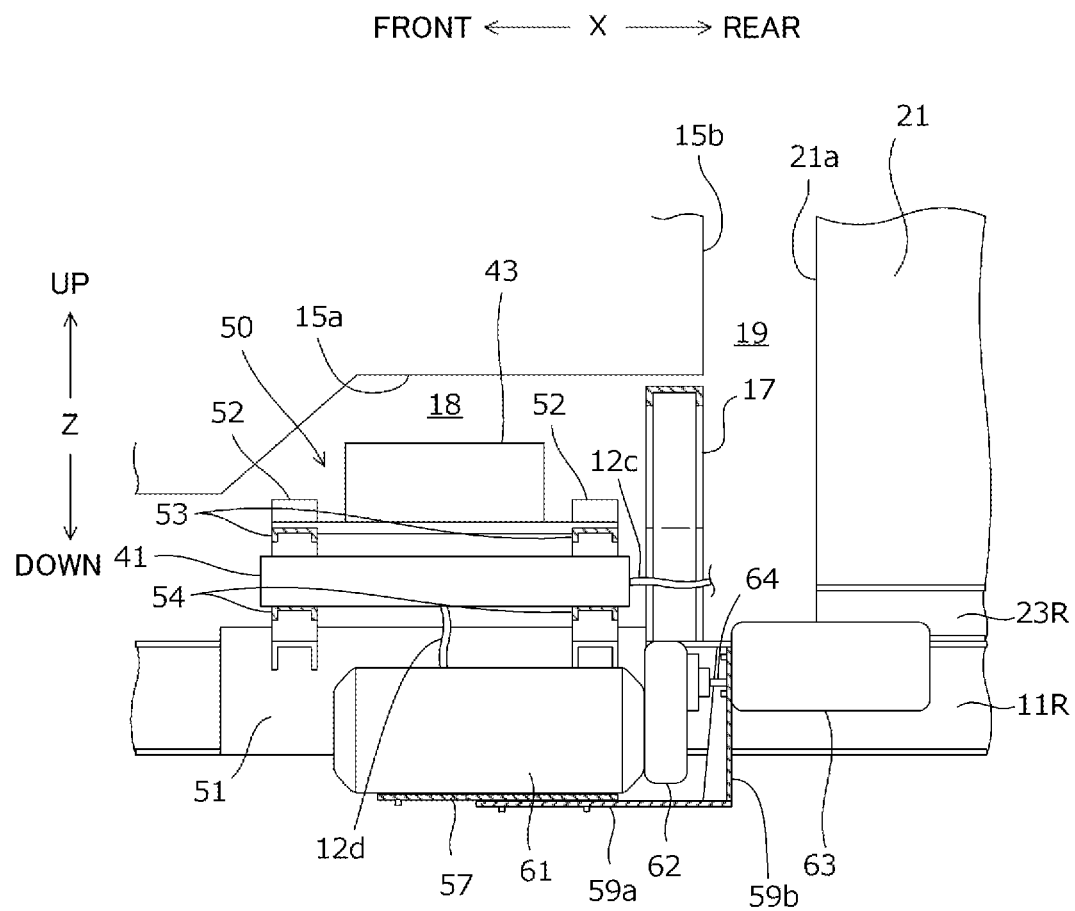
FIG. 7 is a cross-sectional view taken along line the D-D of FIG. 6.

Specifically, as shown in FIGS. 6 and 7, in an under-cab region 18, as in the first embodiment, an electrical component support member 50 having a multilayered structure is provided on main frames 11 that are paired, and an electrical component unit 40 is provided in a top level and a middle level of the electrical component support member 50.

The mounted motor 61 of the PTO unit 60 is provided on a top of a bottom plate 57 corresponding to a bottom level of the electrical component support member 50. That is, also in the second embodiment, the mounted motor 61 is disposed at the lowest position in the electrical component support member 50. The mounted motor 61 is elongated in a vehicle longitudinal direction X. The output shaft of the mounted motor 61 extends rearward, and the gearbox 62 is attached to the output shaft. The gearbox 62 is configured to convert rotational power from the mounted motor 61, via a plurality of internal gears, into the number of revolutions and the torque suitable for the hydraulic pump 63 to output them to the coupling shaft 64 coupled with the hydraulic pump 63.

The hydraulic pump 63 of the PTO unit 60 is disposed in a cab back space 19. Specifically, a coupling plate 59a extends rearward from a bottom plate 57 supporting the mounted motor 61, and a pump support bracket 59b is set upright from the rear end of the coupling plate 59a. The hydraulic pump 63 has its front surface coupled to the pump support bracket 59b and is thus supported by the pump support bracket 59b via the coupling plate 59a from the bottom plate 57. The hydraulic pump 63 extends, in the vehicle longitudinal direction X, from the cab back space 19 to a front of sub-frames 23 supporting the mounted body 20. The hydraulic pump 63 is positioned closer to the right side than the center in the vehicle width direction Y. The hydraulic pump 63 is disposed higher than the mounted motor 61 in the vehicle height direction Z, and extends from the main frame 11 to the sub-frames 23. The hydraulic pump 63 is connected to the garbage work machine 24 via a hydraulic circuit (not shown), and the hydraulic pressure generated by the driving of the hydraulic pump 63 is supplied to the garbage work machine 24.

As described above, also in the electric work vehicle 2 according to the second embodiment, the mounted motor 61 may be mounted without influencing the layout of the electrical component unit 40 by arranging the mounted motor 61 of the PTO unit 60 lower than the electrical component unit 40, in the under-cab region 18. Further, the hydraulic pump 63 for driving the garbage work machine 24 of the mounted body 20 is disposed behind the mounted motor 61 in the vehicle longitudinal direction X, which enables decrease in the distance between the hydraulic pump 63 and the garbage work machine 24, and reduction in influence on the layout on the side of the mounted body 20.

Thus, in case of mounting the PTO unit 60 for driving the compressor 33 by the mounted motor 31, it is possible to reduce the risk of decrease in the length of the cargo bed (load capacity) resulting from mounting the PTO unit 60 while influence of change in layout of the under-cab region 18 is reduced.

In addition, the same advantages as those of the first embodiment can be achieved. Further, the hydraulic pump 63 of the second embodiment is disposed between the left and right main frames 11, which are paired, and between the sub-frames 23. In view of layout of the equipment, space between main frames, space between sub-frames and the like in the vicinity of a cab back space are usually hardly to be utilized and are likely to become dead space. However, in the electric work vehicle 2 of the present embodiment, the hydraulic pump 63 is arranged in such a space. Thus, mounting the PTO unit 60 does not make influence of change in layout of the under-cab region 18. Further, it is possible to mount the PTO unit 60 without increase of the cab back space 19, in contrast with a case when the whole PTO unit 60 is to be mounted in the cab back space 19.

The mounted motor 61 is supported by the bottom plate 57 coupled to the main frame 11. The hydraulic pump 63 is supported by the coupling plate 59a, which is coupled to the bottom plate 57, and the pump support bracket 59b. In this way, the mounted motor 61 and the hydraulic pump 63 are supported on the coupled support member, which enables alleviating the deviation due to vibration between the mounted motor 61 and the hydraulic pump 63, and more reliably transmitting the rotational power of the mounted motor 61 to the hydraulic pump 63.

Although the detailed description of the embodiments of the present invention has been described above, the aspect of the present invention is not limited to the foregoing embodiments.

In the foregoing embodiments, the battery 12 is disposed between the left and right main frames 11 that are paired. However, the battery may be disposed at an outer side of the main frame in the vehicle width direction.

In the foregoing embodiments, only the mounted motors 31, 61 of the PTO units 30, 60 are provided on the bottom plate 57 which corresponds to the bottom level of the electrical component support member 50, but other electrical components may be provided, as well.

DESCRIPTION OF REFERENCE CHARACTERS 1, 2 Electric Work Vehicle
10 Vehicle Body
11 Main Frame
12 Battery
12b Power Distribution Unit
15 Cab
20 Mounted Body
30 PTO Unit
31 Mounted Motor
32 Belt
33 Compressor (Work Machine Drive Unit)
40 Electrical Component Unit
50 Electrical Component Support Member
60 PTO Unit
61 Mounted Motor
62 Gearbox
63 Hydraulic Pump (Work Machine Driving Unit)

The invention claimed is:

1. An electric work vehicle that includes a mounted body enabling execution of a specific work and is capable of running by electric power supplied from a battery, the electric work vehicle comprising:
   a main frame that includes left and right main frames that are paired and extend in a vehicle front-rear direction;
   a cab provided in a front portion of the main frame in the vehicle front-rear direction;
   an electrical component unit disposed on the main frame in a position lower than a lower surface of the cab; and
   a power take off (PTO) unit having a work machine drive unit for driving a work machine to execute the specific work by the mounted body, and a mounted motor for supplying rotational power, by electric power of the battery, to the work machine drive unit;
   wherein in the PTO unit, the mounted motor is in a position lower than the lower surface of the cab and in a lowermost layer region of a space where the electrical component unit is disposed, and the work machine drive unit is disposed in a position rearward from the mounted motor.

2. The electric work vehicle according to claim 1, wherein the mounted motor is arranged such that an output shaft thereof is directed rearward.

3. The electric work vehicle according to claim 1, wherein the space where the electrical component unit is disposed has a multilayered structure including a plurality of electrical component support members on which the electrical component unit is mounted and supported, and
   the mounted motor is disposed on one of the plurality of electrical component support members that constitutes a bottom surface of the multilayered structure.

4. The electric work vehicle according to claim 1, wherein the work machine drive unit is disposed in a position higher than a height at which the mounted motor is mounted and disposed.

5. The electric work vehicle according to claim 1, wherein the work machine drive unit is disposed between the cab and the mounted body on the main frame via a drive unit support member in the vehicle front-rear direction.

6. The electric work vehicle according to claim 1, wherein the work machine drive unit is disposed at least partially between sub-frames, the sub-frames supporting the mounted body, the sub-frames being provided on and/or between the left and right main frames that are paired.

7. The electric work vehicle according to claim 1, wherein the mounted motor is supported by a motor support member coupled to the main frame, and
   the work machine drive unit is supported by a drive unit support member coupled to the motor support member.

8. The electric work vehicle according to claim 1, wherein the work machine drive unit is a compressor.

9. The electric work vehicle according to claim 1, wherein the work machine drive unit is a hydraulic pump.

* * * * *